United States Patent [19]

Cannalte et al.

[11] 4,184,118

[45] Jan. 15, 1980

[54] BASE STATION FEEDBACK REPORTING SYSTEM

[75] Inventors: Gary A. Cannalte, Hoffman Estates; David G. Ramsland, Schaumburg, both of Ill.

[73] Assignee: Motorola, Inc., Schaumburg, Ill.

[21] Appl. No.: 838,594

[22] Filed: Oct. 3, 1977

[51] Int. Cl.² .................... H04B 1/02; H04Q 9/10; H04Q 9/12

[52] U.S. Cl. ..................... 325/183; 325/133; 340/147 F; 340/150; 340/151; 340/171 R; 340/171 PF

[58] Field of Search ............... 325/183, 133; 340/147 F, 150, 151, 171 R, 171 A, 171 PF

[56] References Cited

U.S. PATENT DOCUMENTS

| 2,779,868 | 1/1957 | Rust ......................... 325/133 |
| 3,577,080 | 5/1971 | Cannalte ..................... 325/183 |

OTHER PUBLICATIONS

Michels, H., "Pulsed Tones Control A-M and F-M Stations", *Electronics*, Sep. 1955, pp. 132-136.

*Primary Examiner*—Howard W. Britton
*Attorney, Agent, or Firm*—James S. Pristelski; James W. Gillman; Edward M. Roney

[57] ABSTRACT

The operational status of equipment located at a base station is reported to a remote control terminal. The same audio channel that is used for sending audio signals and control signals to the base station is also used to carry the report signal. The control signals to the base station and the report signals from the base station are encoded tone burst signals. The report signal provides an indication of the proper receipt and execution of a control signal by the base station equipment. Equipment diagnostic signal and periodic checks of equipment performance are also reported by this system.

7 Claims, 6 Drawing Figures

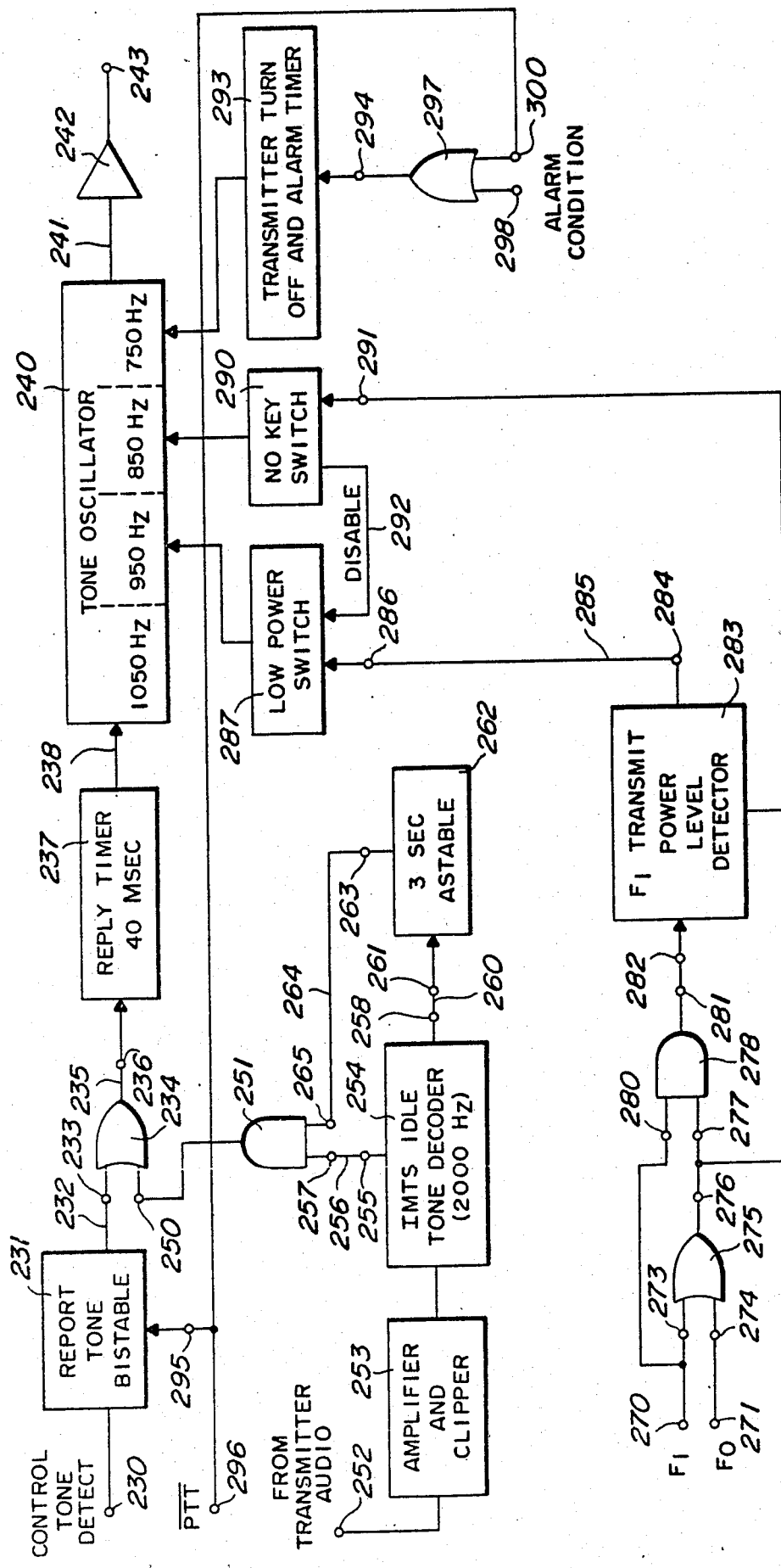

BASE STATION FEEDBACK REPORTING SYSTEM

BACKGROUND OF THE INVENTION

1. Field of the invention

This invention relates generally to base station control systems; and, more particularly, to feedback reporting systems for returning the operational status of said base station equipment to a remote control terminal.

2. Description of the prior art

Oftentimes a radio transmitting and/or receiving base station will be remotely located from the control terminal for said base station. The operation of the base station equipment is then controlled remotely from the control terminal. It is advantageous that the base station equipment have signals which are coupled to the control terminal only by means of audio signal lines, which means that no direct current connections are provided between the control terminal and the base station. All information signals and control signals are then coupled from the control terminal to the base station by audio frequency lines. A system using a single audio channel for providing voice signals and for providing control signals to a base station from a control terminal is disclosed in U.S. Pat. No. 3,577,080 issued to Gary A. Cananalte and assigned to the assignee of the present invention. However, the system disclosed in that patent was a one-way system in the sense that no reply signal was returned (or feedback) from the base station to the control terminal, indicating the correct receipt of the control signal and proper signal operation. For example, no indication was reported to the remote control site that the base station transmitter was actually keyed, that a predetermined output power level was established, or that the transmitter was operationally capable of being modulated. In order to assure a high overall system reliability percentage, it is necessary that some sort of reply signal system be used. Reply signal systems of the prior art used direct current signalling schemes as well as separate feedback signal lines. Obviously, these prior art systems are expensive and not easily incorporated into existing systems having only audio frequency coupling between the base stations and the control terminals.

SUMMARY OF THE INVENTION

Accordingly, an object of this invention is to provide a feedback system for reporting to a remote control terminal the operational status of base station equipment.

It is another object of this invention to provide a feedback reporting system which utilizes the same audio channel line for sending information signals, control signals and report signals.

It is another object of this invention to provide a feedback reporting system wherein the control signals and the report signals are time-multiplexed tone burst signals.

It is a further object of this invention to provide a feedback reporting system for providing diagnostic signals in the event of a base station system malfunction to a remote control site.

It is another object of this invention to provide a feedback reporting system which is compatible with mobile telephone signaling schemes.

Briefly, the invention provides an improved feedback system for reporting to a remote control terminal the operational status of a base station equipment. The base station equipment is coupled to the control terminal by means of a common audio channel. An encoded control signal is sent from the control terminal to the base station equipment and means are provided at the base station for receiving and decoding said encoded signal for initiating a predetermined base station function. Means are provided for sending from the base station on the same audio channel an encoded report signal, indicative of a predetermined operational status of the base station equipment. Means are also provided at the control site for receiving and decoding the encoded feedback signals. According to one aspect of the invention the encoded feedback signals and the encoded control signals are tone burst signals which are time-multiplexed on the audio channel with the information signals appropriately muted. According to another aspect of the invention, the system is used in a mobile telephone system which provides for sending tone bursts at predetermined intervals indicating proper system operation. According to another aspect of the invention a feedback signal includes diagnostic signals indicative of a particular system malfunction.

BRIEF DESCRIPTION OF THE DRAWINGS

For a more complete understanding of the invention, reference is made to the drawings in which:

FIG. 5 is a base station feedback report logic and tone generator according to the invention.

DESCRIPTION OF THE PREFERRED EMBODIMENTS

Figure 1:
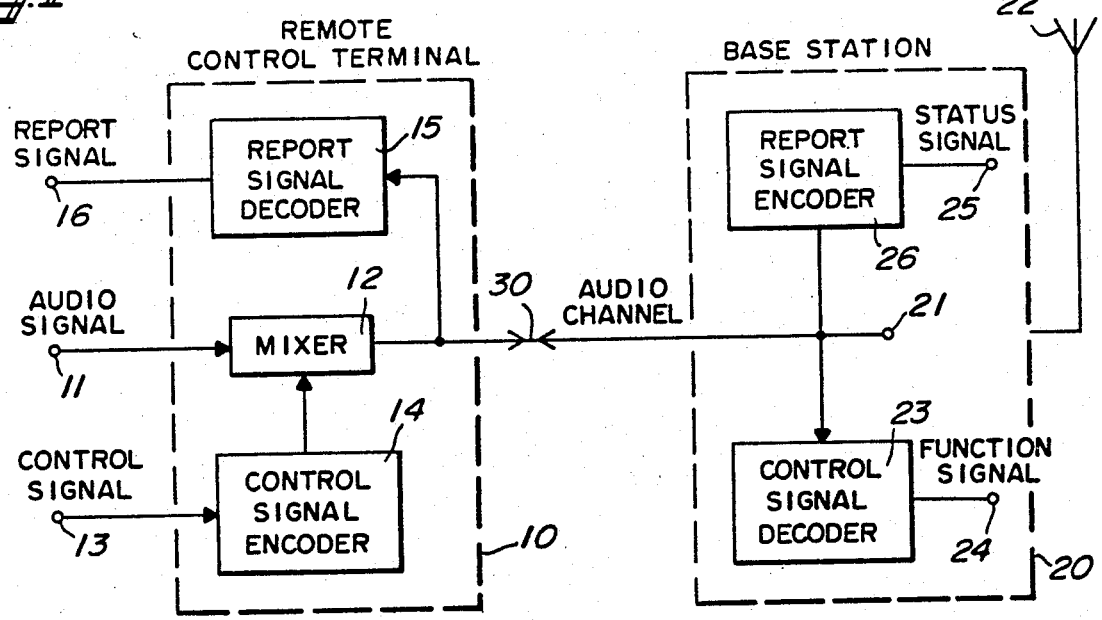
FIG. 1 is a block diagram of a remote control terminal and a base station using the invention.

Referring to FIG. 1 of the drawings, a remote control terminal 10 is shown coupled to a base station 20 by means of a single audio control 30. In a typical situation the base station 20 is located at a distance from the remote control terminal 10, and the base station 20 does not have an operator present. The remote control terminal has an operator present and several base stations are controlled from one remote control terminal. An audio information signal is fed to terminal 11 of the remote control terminal 10. The audio information signal present at the terminal 11 is fed through a linear signal mixer 12, or signal combiner, to the audio channel 30. A control signal is applied at a terminal 13 of the remote control terminal 10. The control signal is a signal selected, for example, by the remote control operator to provide a particular function at the base station 20. These functions include, for example, transmitting a particular radio frequency, transmitting at normal power, transmitting at reduced power, and other base stations control functions known in the art. A U.S. Pat. No. 3,577,080 issued to Gary A. Cananalte and assigned to the assignee of the present invention shows in FIG. 1 a collection of switches for obtaining certain control functions. This patent is incorporated by reference into the present invention. The control signals present at terminal 13 are then fed to a control signal encoder 14, wherein the control signals are put in a signalling format, such as burst of a designated frequency, which tone bursts are suitable for transmission over the audio channel 30. The output of the control signal encoder 14 is fed to the mixer 12 and then to the audio channel 30. The audio channel 30 therefore carries both the audio signal present at terminal 11 and an encoded control signal, the control signal being present at terminal 13 of the remote control terminal 10.

Signals present on the audio channel 30 are fed to a terminal 21 of the base station 20. In the transit mode of operation the signals present at terminal 21 are used, for example, to frequency modulate a radio frequency carrier which is transmitted by means of antenna 22. In the receive mode of operation, the base station 20 receives radio frequency signals by means of the antenna 22 and these radio frequency signals are demodulated by base station equipment to provide received audio signals at terminal 21. Received audio signals are coupled through the audio channel 30 back to the remote control terminal.

The encoded control signal from the remote control terminal is conducted to a control signal decoder 23 in which the control signal is decoded and in which a function signal is derived and applied to a terminal 24. The function signal is used to provide a particular function at the base station which has been selected at the remote control terminal 30, corresponding to the frequency of the tone burst. At a terminal 25 a status signal is provided which indicates a predetermined operational status of some of the base station equipment. The status signal, for example, indicates that the transmitter power is at a normal level, that the transmitter power is at a reduced level, that the transmitter was not keyed, or that some other operational status of the equipment at the base station is present. The status signal is encoded, for example, as a burst of a selected frequency by the report signalling encoder 26 which provides an encoded report signal to the audio channel 30.

At the remote control terminal 10 the encoded report signal is applied to a report signal decoder 15 which provides an output signal at a terminal 16 corresponding to the status signal present at terminal 25 of the base station 20.

Figure 2:
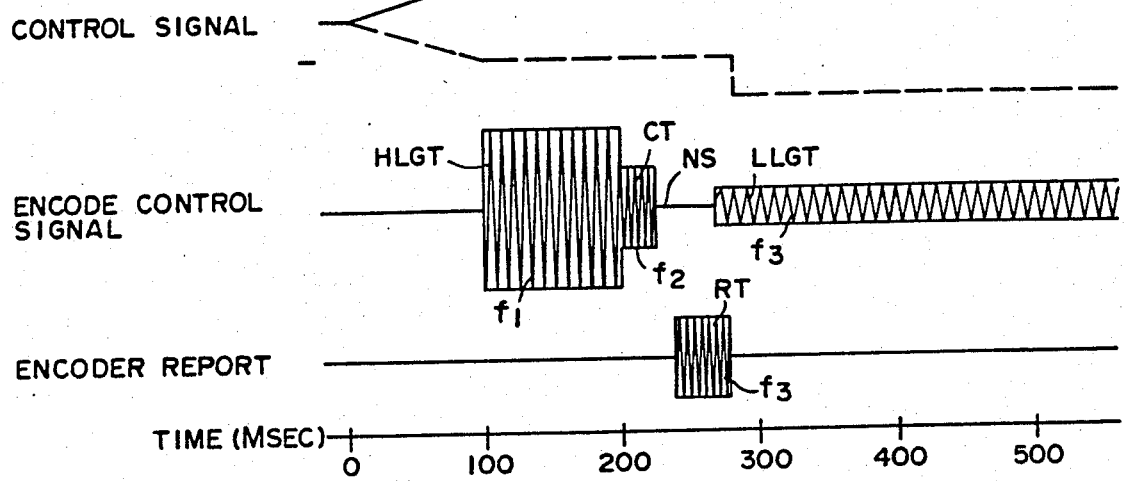
FIG. 2 is a signal timing diagram illustrating operation of a reporting system according to the invention.

Referring to FIG. 2 of the drawings, the signal timing diagram of a system according to the invention is shown, the system being that shown in FIG. 1 of the drawings. The control signal represents the direct current at terminal 13 with terminal 13 being connected to a telephone line. The direct current through a telephone line is used as a control signal in the prior art. The system according to the present invention adapts the prior art signals for transmission through an audio channel and accepts report signals also transmitted through the audio channel. The solid portion of the control signal current representation represents a positive polarity current and the dashed line representation represents a negative polarity control signal current. The positive polarity control current represents, for example, normal transmitter power, while a negative polarity control signal current represents reduced transmitter power. During the first 100 milliseconds, the control signal current builds to a level equal to one-half of the maximum available current. The current at this level causes the control signal encoder 14 to emit a 100 millisecond burst of a signal at frequency $f_1$ called a high level guard tone HLGT signal. The purpose of the HLGT signal is to alert the base station 30 that a control signal will be sent subsequently. A 25 millisecond burst of a frequency $f_2$ designated as the control tone (CT) then follows. The CT signal frequency $f_2$ is decoded at the base station 20 to initiate a particular function signal applied to terminal 24. Following the CT signal a 15 millisecond period of no signal NS occurs which initiates at the base station the generation of a reply signal. During this no signal time period the report signal decoder 15 at the remote control terminal 10 waits for an encoder report signal to be sent on the audio control channel 30 from the base station 20. The function signal at terminal 24 of the base station 20 initiates a predetermined base station function and a status signal is applied to terminal 25 to indicate that the base station equipment is in the correct operational mode as dictated by the function signal present at terminal 24. The status signal may also indicate other operational conditions such as, for example, that the base station equipment is not properly functioning. The report signal encoder 26 generates an encoded report tone RT tone burst of a frequency $f_3$ having a 40 millisecond duration. The RT signal is coupled through the audio channel 30 back to the remote control terminal 10 report signal decoder 15 where a report signal is provided at terminal 16. When the base station 20 is properly operating, the remote control terminal will initiate a low level guard tone signal LLGT having a frequency $f_1$ by equipment not shown in the drawings. The LLGT maintains the base station transmitting equipment in a transmit mode. The encoded signals sent from the remote control terminal 10 to the base station 20 are similar to those disclosed in U.S. Pat. No. 3,577,080.

In more complex radio communications systems, such as a mobile telephone system wherein signals on conventional telephone lines are transmitted through radio frequency paths and received by mobile units, the (LLGT) as described above is utilized to hold the base station transmitter in an activated state. In a mobile telephone system an idle tone signal having a frequency of 2000 Hz is transmitted when a particular radio frequency channel is not being used by a caller.

Figure 6:
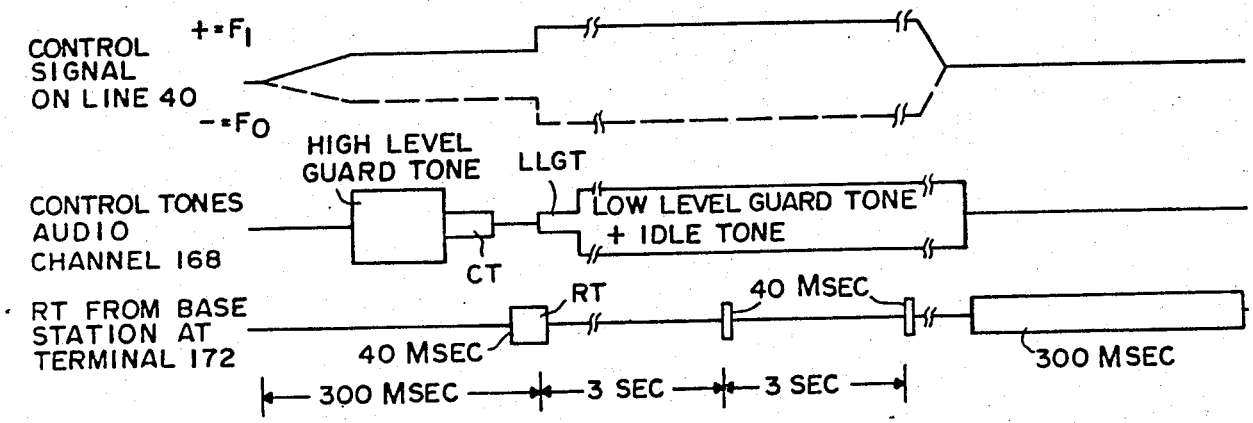
FIG. 6 is a signal timing diagram according to another embodiment of the invention.
Figure 3:
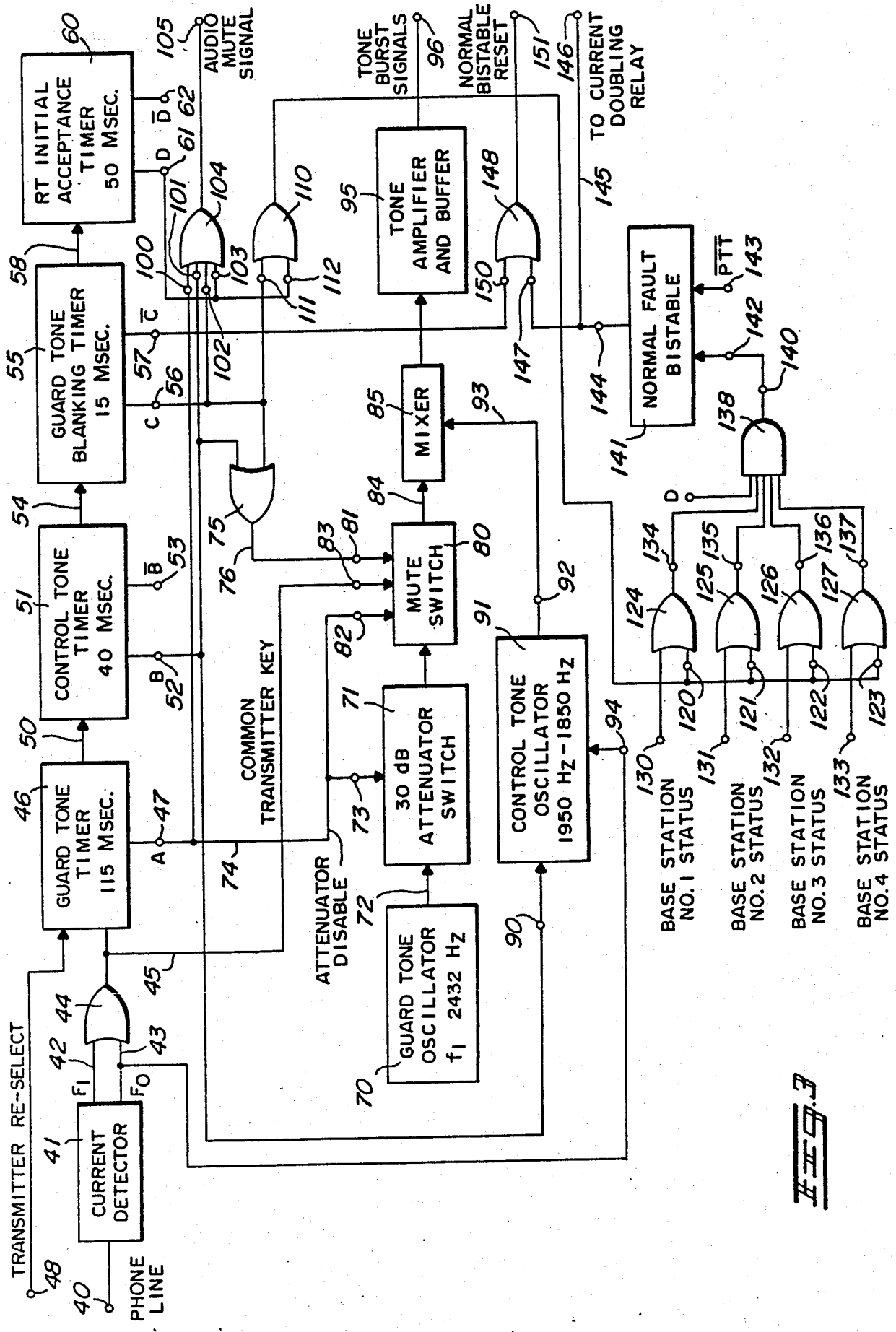
FIG. 3 is a block diagram of a remote terminal tone keying subsystem according to one embodiment the invention.
Figure 4:
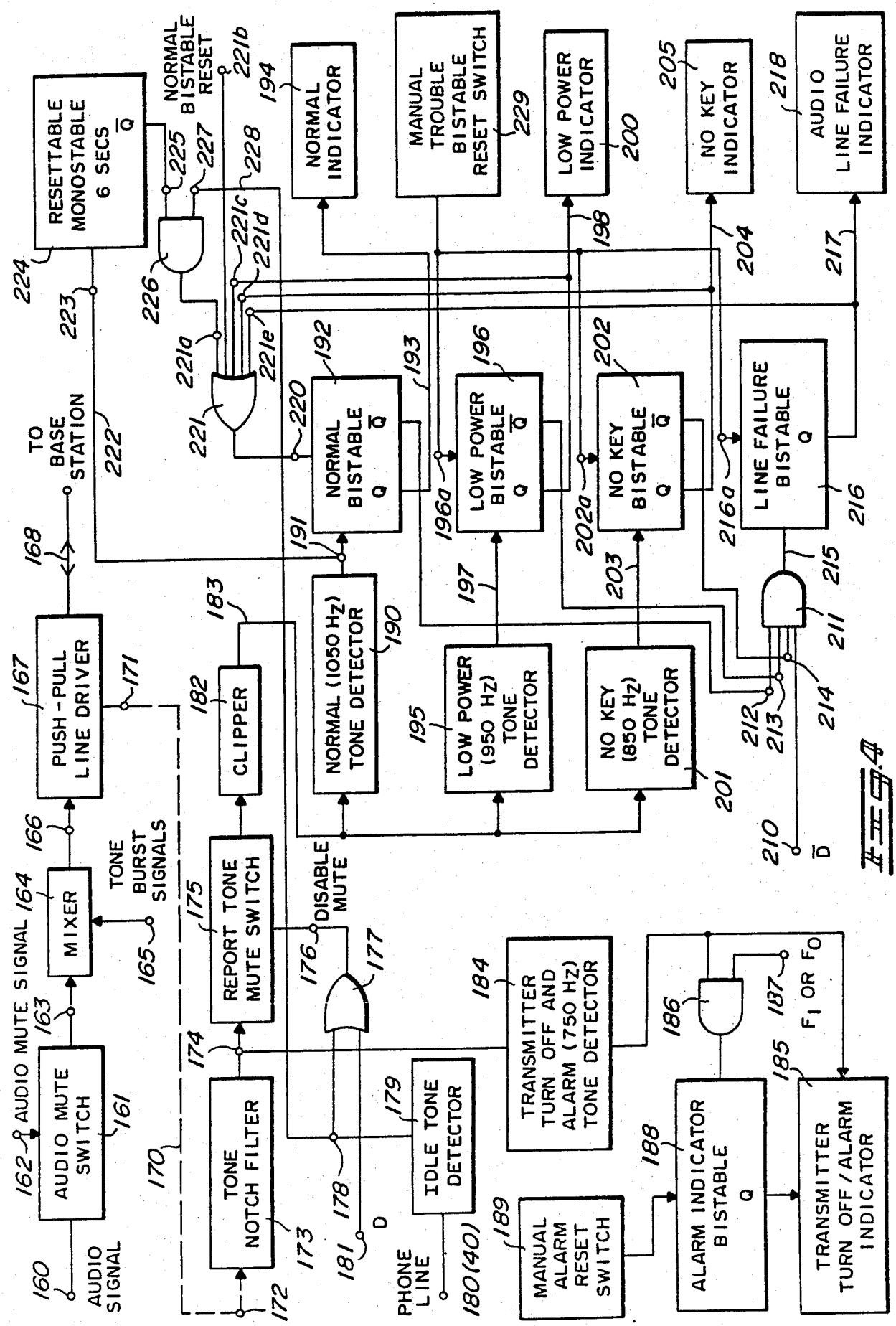
FIG. 4 is a block diagram of a remote terminal signal processing and fault detection subsystem according to the invention.

The block diagram of FIG. 3 and FIG. 4 are further embodiments of a system according to the invention and are contained in a remote control terminal similar to the remote control terminal 10 of FIG. 1. The system shown in the block diagram of FIG. 5 is the corresponding base station circuitry according to the further embodiment of the invention. FIG. 6 shows a signal timing diagram for the further embodiment.

Referring to FIG. 3 of the drawings, the phone line 40 has either a positive current or a negative current impressed thereupon to indicate whether full radio frequency transmit power or reduced radio frequency transmit power are to be transmitted by the base station equipment. The current detector 41 introduces respectively a signal F1 for normal power on a line 42 and a signal F0 for reduced power on a line 43, both of which lines feed an OR gate 44. The output of the OR gate 44 on line 45 feeds a guard tone timer 46, which is triggered by the output of the OR gate 44 and which produces an output signal A at a terminal 47. A transmitter reselect signal is also fed at a terminal 48 to the guard tone timer 46, which will also activate the guard tone timer for .115 milliseconds. The purpose of the transmitter reselect signal is to provide a manual initiation of the signalling tone sequence. At the end of the guard tone timer output pulse a signal on line 50 triggers a control tone timer 51 to produce a 40 millisecond output pulse. The output B of the function tone timer 51 appears at a terminal 52 and the inverted output B appears at a terminal 53. Another output of the function tone timer 51 appears on a line 54 at the end of the function tone timer to provide a trigger signal for the guard tone blanking timer 55 which provides an output pulse C having a 15 millisecond duration at a terminal 56 and an inverted output pulse C at a terminal 57. At the termination of the guard tone blanking timer pulse C a signal appears on a line 58 which triggers the report tone initial acceptance timer 60 having a 50 millisecond pulse output D at a terminal 61 and an inverted output pulse D at a terminal 62. The guard tone timer 46, the function tone timer 51, the guard tone blanking timer 55, and the initial acceptance timer 60 provide the basic timing signals for the remote control terminal operation of this invention.

A guard tone oscillator 70 having a frequency $f_1$ of 2432 Hz is fed to a 30 dB attenuator switch 71 by means of a signal line 72. The attenuator switch 71 is disabled, or removed from the guard tone oscillator 70 signal path, by the presence of signal A at a terminal 73 on attenuator switch 71, that signal being coupled to said terminal 73 on a signal line 74. The attenuator switch 71 is enabled so that 30 dB of attenuation is placed in the signal path at all other times. Thus, a high level of the guard tone oscillator 70 is outputed for 115 milliseconds. A mute switch 80 disables the guard tone oscillator output whenever a signal is present on signal line 76 which feeds a terminal 81 of the mute switch, that is, whenever the control tone timer 51 or the guard tone blanker timer 115 are activated. The mute switch 80 allows signal to pass whenever a signal is present on signal line 74 which is coupled to a terminal 82, that is, whenever the guard tone timer 46 is activated. The guard tone oscillator signal is also allowed to pass through the mute switch 80 whenever a signal is present at a terminal 83 thereof, that signal being coupled by a line 45 from the output of the OR gate 44, which OR gate is activated when the phone line 40 calls for signal F1 or F0. The signal present at terminal 81 overrides the signal present at the terminal 83. The output signal of the mute switch 80 is passed by means of a signal line 84 to a linear mixer circuit 85.

The presence of the control tone timer output signal B at a terminal 90 of a control tone oscillator 91 activates that oscillator to produce an output frequency at a terminal 92, said output signal being coupled to the mixer 85 by means of a signal line 93. The control tone oscillator 91 produces a frequency of 1950 Hz corresponding to the control signal F1. The control tone oscillator produces an output frequency of 1850 Hz when a signal from the current detector 41 is present on line 43, which is coupled to a terminal 94 of the control tone oscillator 91. The control tone oscillator 91 output signal will appear for the duration of the control tone timer 51 output signal. The output of the mixer 85 is fed to a tone amplifier and buffer stage 95 which has an output at a terminal 96.

The output pulses of the four timer circuits A, B, C, D are fed to the input terminals 100, 101, 102, 103, respectively, of the OR gate 104, said OR gate having an output terminal 105. The output signal of the OR gate 104 is used to mute the audio information signal during the operation of the previously mentioned timers.

An OR gate 110 is provided with the guard tone blanking timer output signal C and the initial acceptance timer output D at a terminal 111 and a terminal 112, respectively, the output of the OR gate 110 at a terminal 113 feeds terminals 120, 121, 122, 123, respectively, of OR gates 124, 125, 126, 127. The other inputs provided to each of the respective gates at terminals 130, 131, 132, 133 indicate that particular base stations are functioning properly, for example, a signal at terminal 130 indicates the status of BASE STATION No. 1. The output from the four OR gates at terminals 134, 135, 136, 137, respectively, are fed into the inputs of a strobed AND gate 138, which has an output, if any, during the initial acceptance timer output signal D at a terminal 140. No output is produced at terminal 140 of the strobed AND gate 138 unless each of the receivers is operational or unless each of the transmitter tone burst circuits is producing an initial acceptance timer output signal D. If the proper condition are met so that the strobed AND gate 138 produces an output at the terminal 140, the normal-fault bistable circuit 141 is set by having a signal from the strobed AND gate 138 applied to a terminal 142 thereof. The reset signal for the bistable 141 is applied to a terminal 143 and is the inverted push-to-talk signal PTT. The output of the bistable 141 at a terminal 144 is sent on a signal line 145 to a terminal 146 which is coupled to a current doubling relay which doubles the signal current on the phone line 40. This places a signal on the phone line indicating that the remote control terminal and the base station terminal are operating properly. The signal on line 145 also is connected to a terminal 147 on an OR gate 148. Another input to the OR gate 148 on a terminal 150 is provided by the guard tone blanking timer inverted output pulse C. The output signal of the OR gate 148 at a terminal 151 provides a normal bistable reset signal which resets a bistable having an output indicative of correct system operation, as will be described hereinbelow.

Referring now to FIG. 4 of the drawings, a terminal 160 of an audio mute switch 161 has coupled thereto the audio information signals. The audio mute switch 161 is opened by the audio mute signal being applied to terminal 162, said signal originating from terminal 105 of the OR gate 104 of FIG. 3 to mute the terminal audio signal during the timer output signals. The output of the audio mute switch 161 is coupled to a terminal 163 of a mixer 164. Mixer 164 is the equivalent of the mixer 12 shown in FIG. 1. A terminal 165 of the mixer 164 has coupled thereto the tone burst signals appearing at terminal 96 of the tone amplifier and buffer 95 of FIG. 3. The output of the mixer 164 is fed to a terminal 166 of a push-pull line driver circuit 167 which feeds a bidirectional audio channel 168, similar to the audio channel 30 of FIG. 1. The audio channel 168 couples the signals from the remote control terminal to the base station.

The circuits as shown in FIG. 3 and FIG. 4 are provided to control equipment in one or more base stations locations by means of one remote control terminal.

A dashed signal line 170 is connected to a terminal 171 of the push-pull line driver 167. Terminal 171 is coupled to the bidirectional audio channel 168 and is used to receive the encoded report signals sent from the base station to the remote control terminal. The line 170 is shown as dashed to indicate that it is connected to the push-pull line driver 167 if a single audio channel is used to interconnect the remote control terminal with the base station. If a pair of audio channels were used for connection therebetween, a separate audio channel would fed a terminal 172 of a tone notch filter 173. The tone notch filter 173 removes from the audio channel specific signal frequencies which might interfere with the detection of encoded report signals. The report tones are bursts of particular audio frequencies which are coupled to a terminal 174 of a report tone mute switch 175. The report tone mute switch 175 is opened to allow signals to pass thereto only when a disable mute signal appears at a terminal 176 thereof. The disable mute signal is the output of an OR gate 177. At a terminal 178 feeding one input of the OR gate 177 an idle tone detector 179 output signal appears when a mobile telephone system channel is in an unused, or idle, state. In the idle state an idle tone is presented to terminal 180 (terminal 40 of FIG. 3) by the phone line. Appearing at another terminal 181 of the OR gate 177 is the report tone initial acceptance timer output signal D. The presence of the D signal at terminal 181 or the idle tone detector output signal at terminal 178 allows signal to pass through the mute switch 175 to a high gain clipper circuit 182. The output of the clipper 182 is fed on a line 183 to tone detectors. The output of the tone notch filter 173 at terminal 174 is fed to the input of a transmitter turn off and alarm detector 184 which detects the presence of a 300 milliseconds 750 Hz tone burst and provides an output signal to the transmitter turnoff/alarm indicator 185. The turnoff indicator 185 is, for example, a light emitting diode display which flashes for a brief period. The tone detector output 184 also feeds one input of an AND gate 186, the other input thereof being connected to a terminal 187 which has coupled thereto either of the push-to-talk signals F1 or F0. If either F1 or F0 are inputted to the gate simultaneously with an output from the tone detector 184, a fault has occurred and the alarm indicator bistable 188 is set by the AND gate 186 output. The bistable 188 Q output activates the transmitter turnoff/alarm indicator 185. The alarm bistable 188 is manually reset by a manual alarm reset switch 189. The normal tone detector 190 detects the presence of a tone burst at a 1050 Hz frequency and provides an output at a terminal 191 in response thereto to set a normal bistable 192, said normal bistable 192 having an output signal Q on a line 193 which activates a normal indicator 194, which is, for example, a light emitting diode display. Similarly, line 183 also feds a low power detector 195 which detects the presence of a 950 Hz tone burst and sets a low power bistable 196 through a line 197, said low power bistable 196 having an output Q on line 198 which feds a low power indicator 200. A no-key tone detector 201 is also fed by the line 183 and is responsive to a tone burst at a frequency at 850 Hz, the output of said tone detector keying a no-key bistable circuit 202 which is fed from a line 203, providing an output on a line 204 to a no-key indicator circuit 205. The initial acceptance timer inverted output D from the terminal 62 is coupled to a terminal 210 of an AND gate 211. An input terminal 212 is connected to the Q output of the normal bistable 192; an input terminal 213 is connected to the Q output of the low power bistable 196; and an input 214 is connected to the Q of the output of the no-key bistable 202. This logic configuration provides an output from the AND gate 211 during the time that the initial acceptance timer 60 is not activated. If neither the normal bistable 192, the low power bistable 196, nor the no-key bistable 202 are activated, indicating that the audio channel 168 has failed in some manner, the output of the AND gate 211 on line 215 causes the line failure bistable 216 to have a Q output on line 217 which feeds an audio line failure indicator 218. The tone detector, bistable, and indicator circuits as described above serve as diagnostic aids located at the remote control terminal for determining the operational condition of equipment at the base station or the audio channel.

The normal bistable 192 is reset by a signal appearing at the reset terminal 220 from the OR gate 221. The OR gate 221 at a terminal 222 has an input provided from the normal bistable reset signal of the OR gate 148 of FIG. 3. Inputs to the OR gate 221 are also provided at terminals 221c, 221d, and 229e from the Q outputs, respectively, of the low power bistable 196, the no-key bistable 202, and the line failure bistable 216. When any of these bistables is set, the normal bistable 192 is reset. The output of the normal tone detector 190 at terminal 191 is also fed by a line 222 to an input terminal 223 of a monostable circuit 224 which has a 6 second output feeding a terminal 225 of a AND gate 226. The other AND gate input at a terminal 227 is obtained by line 228 from terminal 178, which has an idle tone detector output signal thereupon. Note that the normal tone detector output pulses occur every 3 seconds if the system is functioning properly. The 6 second monostable circuit 224 therefore has a trigger signal every 3 seconds, and the monostable output at terminal 225 remains high under those conditions. The AND gate 226 output feeding OR gate 221 at a terminal 221a remains low as long an idle tone is being detected and as long as a normal tone burst is detected at least every 6 seconds, allowing at most alternate normal tone bursts to be missed. If these conditions are met, the normal bistable 192 is reset through OR gate 221. The low power bistable 196, the no-key bistable 202, and the line failure bistable 216 are reset by signals at terminals 196a, 202a, and 216a, respectively, by an output signal from a manual trouble bistable reset switch 229 by means of which an operator provides manual reset for these circuits.

Referring now to FIG. 5 of the drawings, circuitry at a base station location in accordance with the further embodiment of the invention is shown. At a terminal 230 of a report tone bistable 231 is provided a CONTROL TONE DETECT signal provided from the circuitry, such as is shown in FIG. 1 of U.S. Pat. No. 3,577,080 as circuit elements 50-55 for setting the report tone bistable 231. The report tone bistable 231 has an output on a line 232 which feeds a terminal 233 of an OR gate 234, the output of the OR gate on line 235 being fed to a terminal 236 of a reply timer circuit 237 which has a 40 millisecond activation time and the output of which appears on a signal line 238 for starting and stopping a return tone oscillator 240. One of four frequencies is selected for the output frequency of the return tone oscillator 240 by selection circuitry. The output of the return tone oscillator 240 is fed on a line 241 to a report tone amplifier 242 which has an output terminal 243 which is coupled to the bidirectional audio channel for sending report tone bursts back to the remote control site.

The OR gate 234 has a terminal 250 which is fed from an AND gate 251. The AND gate 251 allows the reply timer 237 to be activated by means other than detection of a high level guard tone. In an improved mobile telephone systems IMTS an idle tone having a frequency of 2000 Hz is commonly transmitted to indicate that a radio telephone channel is not being utilized by a subscriber. The IMTS idle tone is coupled to a terminal 252 from the transmitter audio circuits to an amplifier and clipper circuit 253, the output of which feeds an IMTS idle tone decoder 254 which provides a continuous output signal at a terminal 255, said terminal being coupled by a line 256 to a terminal 257 of the AND gate 251. A signal is present at terminal 257 as long as an idle tone is being transmitted. The IMTS idle tone decoder 254 also has an output signal at a terminal 258 which is coupled to a line 260 to a terminal 261 of an astable circuit 262. In normal operation the astable 262 has an output at a terminal 263 which is coupled through a line 264 to a terminal 265 of the AND gate 251, the output being a pulse occurring every 3 seconds. Therefore, the reply timer 237 is triggered every 3 seconds indicating that the IMTS idle tone is present on the transmitted signal. This indicates to the remote control site that the transmitter is in an idle channel operational condition.

At terminals 270, 271, respectively, either signal F1 or signal F0 may be present and if present they, respectively, indicate that either full power or reduced power are present. Also at a terminal 272 a signal from an RF power detector circuit indicative of the RF power level of the transmitter is present. Signals F1 and F0 are coupled respectively to terminals 273 and 274 of an OR gate 275, the output of which appears at a terminals 276 and feeds a terminal 277 of an AND gate 278, another terminal 280 of AND gate 278 has the F1 signal present thereat. The output of the AND gate 278 at a terminal 281 is fed to a terminal 282 of a F1 power transmit power level detector circuit 283 which monitors the RF power level output signal at terminal 272. The output of the power level detector at a terminal 284 is fed by means of a line 285 to a terminal 286 of a low power tuning switch 287 which activates elements of the report tone oscillator 240 for providing an output frequency of 950 Hz. A no-key tuning switch 290 causing the report tone oscillator 240 to operate at frequency of 850 Hz is activated by a signal appearing at a terminal 291 thereof from the output terminal 276 of the OR gate 275, indicating that neither the F1 or F0 signal is present. A disable signal sent from the no-key tuning switch 290 on a line 292 to the low power tuning switch 287 disables the low power tuning switch when the no-key tuning switch 290 is activated. A transmit turn-off and alarm timer 293 causes the report tone oscillator 240 to operate for a 300 millisecond duration and at a frequency of 750 Hz when a certain signal is present at terminal 294, which is coupled to the output of an OR gate 297. At terminal 298 of OR gate 297 is an alarm condition signal, which indicates a failure condition, such as loss of primary power or, for example, signal F0 and idle tone are simultaneously present. At a terminal 300 of the OR gate 297 is a PTT signal, indicating absence of a push-to-talk signal, or that the F1 or F0 signal is not present. The PTT signal is provided at a terminal 296 from the base station equipment. F1 and F0 are the push-to-talk signals for transmitter high power and reduced power, respectively. Note that normally the report tone oscillator 240 operates at a frequency of 1050 Hz, indicating normal system operation. The circuitry as shown in FIG. 5 functions to provide diagnostic signals to the remote control site, said signals indicative of the operational status of the base station equipment.

Referring to FIG. 6 of the drawings the signal timing diagrams for the circuit shown in FIGS. 3, 4, and 5 are shown. The control signal on line 40 is similar to the control signal of FIG. 2. The control tone output on audio channel 168 is similar to the encoded control signal of FIG. 2 except that an idle tone is shown added to the signal after the low level guard tone LLGT has been established. The 40 millisecond report tone bursts from the base station at terminal 172 is similar to the encoded report signal of FIG. 2 except that the report tone occurs periodically, that is, every 3 seconds in normal systems operations. Also shown is a 300 millisecond tone burst representing a transmitter turn off tone burst also present at terminal 172 of FIG. 4. Note that the low level guard tone and idle tone signal on audio channel 168 has been removed indicating transmitter turnoff.

While particular embodiments of the present invention have been shown and described, it should be understood that the invention is not limited thereto contemplated to cover by the present applications any and all such modifications that fall within the true spirit and scope of the basic principles disclosed and claimed herein.

I claim:

1. In a mobile telephone system, a system for reporting to a control terminal the operational status of a base station equipment being responsive to a control signal sent from the control terminal on an audio channel, the system comprising:

means at the control terminal for sending on the audio channel an encoded control signal of uniform time interval from the control terminal to the base station;

means at the base station for receiving and decoding the encoded control signal to initiate a predetermined base station function;

means for sending to the control terminal from the base station on the audio channel an encoded report signal of uniform time interval indicative of a predetermined operational status of the equipment at the base station; and means for receiving the encoded report signal at the control terminal.

2. The system of claim 1 wherein the encoded control signal and the encoded report signal are tone burst signals, time multiplexed onto the audio channel.

3. The system of claim 1 including means for providing a report signal indicative of the receipt and execution of a control signal by the base station equipment.

4. The system of claim 1 wherein the means for sending the encoded report signal includes means for sending diagnostic signals in the event of system malfunction and wherein the means for receiving the encoded report signals includes means for detecting the diagnostic signals and providing an output signal indicative thereof.

5. The system of claim 1 wherein the encoded report signal includes a tone burst signal periodically sent to the base station.

6. The system of claim 1 including means for muting information signals applied to the audio channel during transmission of control and report signals.

7. In a mobile telephone system, a system for reporting to a control terminal the operational status of a base station equipment, said base station equipment being responsive to a control signal sent from the control terminal on an audio channel, the system comprising:

means at the control terminal for sending on the audio channel an encoded control signal of uniform time interval from the control terminal to the base station;

means at the base station for receiving and decoding the encoded control signal to initiate a predetermined base station function;
means for sending to the control terminal from the base station on the audio channel an encoded report signal of uniform time interval indicative of a predetermined operational status of the equipment at the base station;
means for receiving the encoded report signal at the control terminal;
means for including in said encoded report signal, in sequence, a high level guard tone burst, a low level function tone burst, a no-signal time period, and a low level guard tone; means for including in said encoded report signal a tone burst present during the no-signal time period;
means for adding an idle-channel tone signal to the low-level guard tone, said idle-channel tone indicative of an available mobile telephone channel, signal sending means for sending a tone burst at predetermined intervals, said tone burst indicative of proper system operation; and
means at the control terminal for detecting the tone bursts at predetermined intervals.

* * * * *

UNITED STATES PATENT AND TRADEMARK OFFICE
CERTIFICATE OF CORRECTION

PATENT NO. : 4,184,118
DATED : January 15, 1980
INVENTOR(S) : Gary A. Cannalte and David G. Ramsland It is certified that error appears in the above-identified patent and that said Letters Patent are hereby corrected as shown below:

Column 2, line 34, after "embodiment", insert --of--; line 48, change "control" to --channel--. Column 3, line 14, change "transit" to --transmit--; line 31, change reference numeral "30" to --10--. Column 4, line 3, change reference numeral "30" to --20--; line 6, change "f2" to --$f_2$--. Column 5, line 4, change "B" to --$\bar{B}$--; line 10, change "C" to --$\bar{C}$--; line 14, change "D" to --$\bar{D}$--. Column 6, line 19, change "condition" to --conditions--; line 25, change "PTT" to --$\overline{PTT}$--; line 35, change "C" to --$\bar{C}$--. Column 7, line 1, change "fed" to --feed--; lines 46 and 49, change "feds", each occurrence, to --feeds--; line 58, 59 and 61, change "Q", each occurrence to --$\bar{Q}$--. Column 8, line 28, after "long" insert --as--. Column 9, line 24, change "terminals" to --terminal--; lines 52 and 54, change "PTT", each occurrence to --$\overline{PTT}$--.

Signed and Sealed this

Twenty-fourth Day of June 1980

[SEAL]

Attest:

SIDNEY A. DIAMOND

Attesting Officer

Commissioner of Patents and Trademarks